United States Patent
Hausberg et al.

(10) Patent No.: US 8,878,466 B2
(45) Date of Patent: Nov. 4, 2014

(54) ELECTROMECHANICAL LINEAR ACTUATOR

(75) Inventors: Andre Hausberg, Kassel (DE); Carsten Wintjen, Grebenstein (DE); Werner Pfluegen, Ahnatal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 444 days.

(21) Appl. No.: 13/380,566

(22) PCT Filed: Jun. 30, 2010

(86) PCT No.: PCT/EP2010/059242
§ 371 (c)(1),
(2), (4) Date: Dec. 23, 2011

(87) PCT Pub. No.: WO2011/000850
PCT Pub. Date: Jan. 6, 2011

(65) Prior Publication Data
US 2012/0137799 A1    Jun. 7, 2012

(30) Foreign Application Priority Data
Jul. 2, 2009 (DE) .......................... 10 2009 027 418

(51) Int. Cl.
| | | |
|---|---|---|
| *H02K 41/00* | (2006.01) | |
| *F16H 25/20* | (2006.01) | |
| *H02K 7/06* | (2006.01) | |
| *F16H 25/24* | (2006.01) | |
| *H02K 7/102* | (2006.01) | |
| *H02K 16/00* | (2006.01) | |

(52) U.S. Cl.
CPC ................ *F16H 25/205* (2013.01); *H02K 7/06* (2013.01); *F16H 25/2454* (2013.01); *F16H 2025/2059* (2013.01); *H02K 7/1021* (2013.01); *H02K 16/00* (2013.01)

USPC ........... 318/135; 318/156; 318/552; 318/560; 318/625; 318/372; 74/824; 74/411.5; 74/823; 74/614; 310/77; 310/123; 310/80

(58) Field of Classification Search
USPC ......... 318/54, 8, 135, 372, 560, 687, 38, 437, 318/671, 520, 685, 486, 625; 310/77, 310/12.24, 80, 20, 17, 75 R; 244/221, 228, 244/229, 99.14, 400.38; 74/89, 89.26, 74/89.33, 89.37, 625, 89.38, 424.92; 475/254, 263, 6, 900, 5, 317
See application file for complete search history.

(56) References Cited

U.S. PATENT DOCUMENTS

| | | | |
|---|---|---|---|
| 4,289,996 A | | 9/1981 | Barnes et al. |
| 5,957,798 A | * | 9/1999 | Smith et al. ........................ 475/5 |

(Continued)

FOREIGN PATENT DOCUMENTS

| | | |
|---|---|---|
| EP | 1 262 687 A2 | 12/2002 |

(Continued)

*Primary Examiner* — Kawing Chan
*Assistant Examiner* — Jorge L Carrasquillo
(74) *Attorney, Agent, or Firm* — Davis & Bujold, PLLC; Michael J. Bujold

(57) ABSTRACT

An electro-mechanical linear actuator unit comprising an actuator housing that accommodates at least two electric drives, each of which, when actuated by a control device, sets an associated drive of a respective spindle drive into rotation for adjusting linear movement of the associated spindle drive in order to produce relative linear adjustment of a control rod. The two electric drives are located in the actuator housing in such manner that relative adjustment can be produced by simultaneous actuation of the two electric drives, as the sum of the adjustment movements of the associated spindle drives, or by actuating a single electric drive, as the adjustment movement of the associated spindle drive. A respective brake is provided, in an area of each of the two electric drives, which can be selectively actuated by the control device to then prevent the adjustment movement of the respective associated spindle drive.

9 Claims, 1 Drawing Sheet

(56) References Cited

U.S. PATENT DOCUMENTS

| | | | | |
|---|---|---|---|---|
| 6,158,295 | A * | 12/2000 | Nielsen | 74/89.38 |
| 6,419,606 | B1 * | 7/2002 | Tengan et al. | 475/5 |
| 8,640,562 | B2 * | 2/2014 | Pettersson | 74/89.37 |
| 2003/0090228 | A1 * | 5/2003 | Wilkens | 318/560 |
| 2005/0168084 | A1 * | 8/2005 | Tesar | 310/80 |
| 2006/0266146 | A1 * | 11/2006 | Waide | 74/424.92 |
| 2009/0044645 | A1 * | 2/2009 | Buescher | 74/89 |

FOREIGN PATENT DOCUMENTS

| | | |
|---|---|---|
| EP | 1 793 477 A1 | 6/2007 |
| WO | 2007/024220 A1 | 3/2007 |
| WO | 2008/028184 A2 | 3/2008 |
| WO | 2008/112363 A2 | 9/2008 |

* cited by examiner

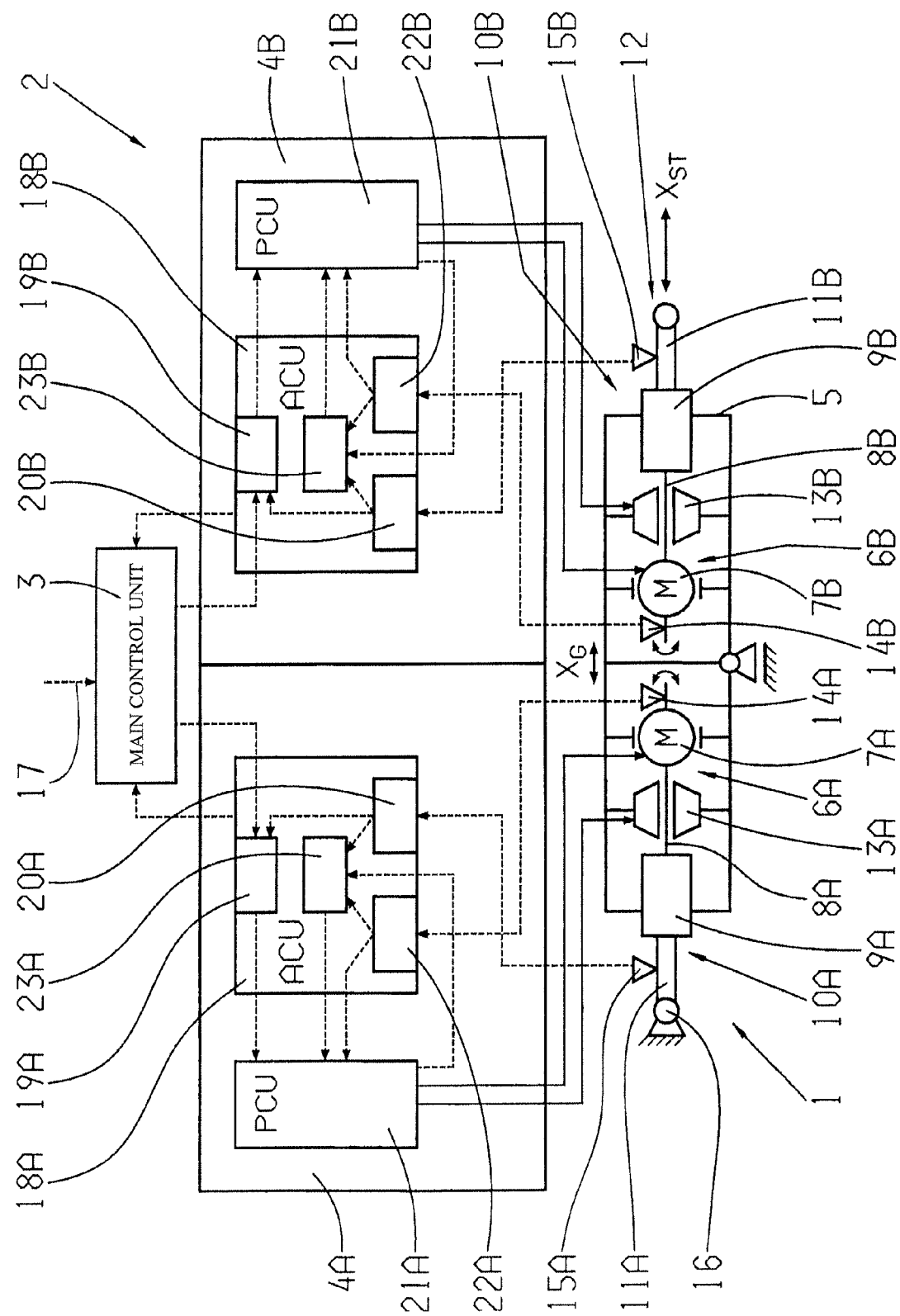

ELECTROMECHANICAL LINEAR ACTUATOR

This application is a National Stage completion of PCT/EP2010/059242 filed Jun. 30, 2010, which claims priority from German patent application serial no. 10 2009 027 418.9 filed Jul. 2, 2009.

FIELD OF THE INVENTION

The invention concerns an electro-mechanical linear actuator unit comprising an actuator housing which accommodates at least two electric drives, each of which when actuated by a control device independently of one another sets into rotation an associated drive means of a spindle drive and thereby in each case brings about linear adjusting movement of the spindle drive concerned in order to produce relative linear adjustment of a control rod, such that the at least two electric drives are located in the actuator housing in such manner that the relative adjustment can be produced by simultaneous actuation of the at least two electric drives, as the sum of the linear adjusting movements of the associated spindle drives, or by actuating a single electric drive, as the adjusting movement of the respectively associated spindle drive. Furthermore, the invention concerns a method for operating the electro-mechanical linear actuator unit.

BACKGROUND OF THE INVENTION

In the field of helicopter control systems, among other things linear actuator units are used, by means of which control inputs from the pilot can be transmitted by operating elements to control components of the helicopter. For this, in modern controls electric systems are used increasingly, by which these control signals are converted electro-mechanically into linear control movements. These electro-mechanical linear actuator units are usually made as redundant components so that even in the event that an individual component should fail, the flight can continue safely and the helicopter can be landed.

From US 2005/0168084 A1 an electro-mechanical linear actuator unit is known, in which two electric drives are accommodated in an actuator housing, each of which independently of one another sets into rotation a plurality of screw-threads of a respectively associated spindle drive. In this case, by virtue of the drive and rotation of the threads of the first spindle drive the actuator housing is displaced in a linear direction relative to a surrounding housing, while by actuating the threads of the second spindle drive by means of the electric drive associated therewith a control rod can be displaced linearly. Thus, the electric drives are located in the actuator housing in such manner that relative linear adjustment of the control rod relative to the housing can be produced, on the one hand, as the sum of the adjusting movements and adjustment speeds of the two spindle drives, but also, on the other hand, especially if one of the spindle drives should fail, by means of a single spindle drive.

By summing together the adjustment paths covered by and the speeds of the individual spindle drives, relative adjustments of the control rod to be produced in normal operation can be distributed uniformly between the two spindle drives and electric drives. This allows the adjustment speeds and accelerations to be produced by the individual electric drives to be halved, which ultimately also enables the individual electric drives to be made smaller and hence lighter.

Moreover, it is generally known that an electro-mechanical linear actuator unit of such type comprises a control device which actuates the two electric drives in accordance with control specifications from a pilot.

However, an electro-mechanical linear actuator of the prior art has the disadvantage that when high external axial forces are acting on the control rod, the electric drives have to be continually electrically acted upon by the control device in order to maintain a set linear position. But in the event that an electric drive has failed, this can result in the occurrence of undesired relative adjustments of the control rod, or in the undesired compensation by the spindle drive of the faulty drive, of actuation movements produced by the still functional electric drive.

SUMMARY OF THE INVENTION

The purpose of the present invention is therefore to provide an electro-mechanical linear actuator unit with which undesired adjusting movements of the individual spindle drives can be reliably prevented. Furthermore, the control device of the electro-mechanical linear actuator unit should be capable of controlling such a measure in the event that individual components fail.

The invention is based on the technical principle that in the area of each of the at least two electric drives a respective brake is provided, which can be actuated selectively by the control device and which then prevents adjustment movement of the spindle drive concerned. Consequently the spindle drive is held in the set position without the need for continual action upon the electric drive concerned in the event that one of the spindle drives should fail. Moreover, even if one of the spindle drives does fail, the required relative adjustment of the control rod can be carried out by the still functional spindle drive, and undesired adjustment movements by the faulty spindle drive can be effectively excluded by the activated brake. Consequently the operational reliability of the electro-mechanical linear actuator unit as a whole is increased.

In an embodiment of the invention the at least two electric drives each comprise an electric motor, which in each case, by means of a driveshaft, sets an associated spindle unit of the respective spindle drive into rotation when actuated by the control device, whereas the associated brake, when actuated, arrests the driveshaft concerned. Advantageously, this allows the production of a very compactly built electro-mechanical linear actuator unit in which inadmissible adjustment movements of the individual spindle drives can be reliably prevented by forming a frictional connection between the brake concerned and the associated driveshaft.

In a further development of the invention the at least two electric drives can be actuated individually by a respectively associated control branch of the control device, these each being provided individually with sensor means and being connected to a main control unit. This has the advantage that the drives are thus regulated by control branches which act independently of one another and which are only subordinate to the main control unit. Accordingly, defects that occur in one control branch and one electric drive have no adverse effect on an adjacent drive. In this case, within each control branch the measurement data picked up by the associated sensor means are balanced and power-transmitting components are monitored, so that if a fault is detected the brake of the associated electric drive is actuated. Consequently, any faults that occur can be recognized promptly and any associated, undesired adjustment movements can be reliably prevented by actuating the brake concerned.

A further, advantageous embodiment feature of the invention is that in each case the sensor means consist of a linear sensor for detecting a linear position of a spindle rod of the respective associated spindle drive and a respective rotation sensor for detecting an angular position of the associated electric drive. By providing a rotation sensor in the area of each electric drive, the latter can be regulated in a simple and, at the same time, reliable manner by the respective control branch. Furthermore, by comparing the measurement data with the adjacent paths determined by the linear sensor of the associated spindle drive, defects can be inferred, since with reference to the measured rotation of the electric drive a theoretical adjustment movement on the spindle rod of the respectively associated spindle drive can be calculated and compared with the actual path detected by the linear sensor.

In accordance with another embodiment of the invention, each control branch is formed by an ACU and a PCU, the ACU in each case monitoring the associated electric drive and the spindle drive concerned by virtue of the sensor means, while the PCU in each case controls the associated electric drive and the brake concerned in accordance with specifications from the associated ACU. The abbreviation ACU here means an Actuator Control Unit for monitoring the respective part of the actuator unit, and the abbreviation PCU means a Power Control Unit for controlling the electric components of the part. This has the advantage that the division into regulation and monitoring on the one hand, and control function on the other hand, reduces the probability of a defect in the control branch concerned.

In a further development of the invention, the respectively associated brake suppresses the adjustment movement of the spindle drive concerned in its unenergized condition. This ensures that in the event of an interruption of the current supply to the control system, inadmissible adjustment movements of the spindle drive concerned are prevented and safe flying operation is therefore made certain.

A design feature of the invention is that if a fault is detected, the main control unit sends modified regulation specifications to the control branch that is still working correctly, so that despite the fault a required relative adjustment of the control rod is achieved. Thus, in this case the regulation is altered in such manner that the required adjustment movement is produced by the electric drive that is still working correctly, by means of its associated spindle drive. Consequently the functionality of the linear actuator unit is ensured even if individual components should fail.

The solution according to the invention can also be embodied in the form of a computer program product which, when run on the processors of the main control unit and the control branches, induces the processors by software means to carry out the associated process steps in accordance with the object of the invention.

In this connection a computer-readable medium is also part of the object of the invention, on which the computer program product described above is stored and from which it can be called up.

BRIEF DESCRIPTION OF THE DRAWING

Below, further measures that improve the invention are shown in greater detail together with the description of a preferred example embodiment of the invention, given with reference to a single FIGURE.

DETAILED DESCRIPTION OF THE PREFERRED EMBODIMENTS

The single FIGURE shows a diagrammatic view of the electro-mechanical actuator unit according to the invention. This consists of an actuator portion 1 and a control device 2 which regulates and monitors the actuator portion 1 and which is composed of a main control unit 3 with two control branches 4A and 4B linked to it.

The actuator portion 1 comprises an actuator housing 5 in which are located two electric drives 6A and 6B. These electric drives 6A and 6B consist in each case of an electric motor 7A and 7B, which individually, in each case by means of an associated driveshaft 8A and 8B and a respectively associated spindle nut 9A and 9B, set into rotation a respectively associated spindle drive 10A and 10B. This rotation of the spindle nuts 9A and 9B brings about linear adjustment movement of respectively associated spindle rods 11A and 11B. In this case the spindle rod 11B at the same time also forms a control rod 12 of the electro-mechanical linear actuator unit according to the invention, by means of which, when the actuator portion 1 is actuated by the control device 2, linear actuation tasks are performed in the areas of a helicopter known to those who understand the subject. Furthermore, both in the area of the driveshaft 8A and in the area of the driveshaft 8B of the electric drives 6A and 6B, a respective brake 13A and 13B is provided, which in each case, when not energized by current, come into contact with the associated driveshaft 8A or 8B and suppress its rotation. Finally, the actuator portion 1 comprises sensor means in the form of rotation sensors 14A and 14B for detecting an angular position of the respectively associated electric motors 7A and 7B, and linear sensors 15A and 15B for detecting the linear position of the spindle rods 11A or 11B.

If now the spindle nut 9A is set into rotation by the electric motor 7A by means of the driveshaft 8A, then the adjustment movement brought about by the spindle drive 10A displaces the actuator housing 5 linearly relative to a housing 16 by an adjustment distance $x_G$. At that moment the distance $x_G$ also corresponds to relative linear adjustment of the control rod 12 relative to the housing 16. However, by virtue of the additional actuation of the electric motor 7B and the consequent driving of the spindle nut 9B, the control rod 12 is additionally displaced relative to the actuator housing 5 and thus, assuming opposite rotations of the electric motors 7A and 7B or opposite pitch directions of the spindle drives 10A and 10B, the relative adjustment of the control rod 12 relative to the housing 16 is increased, whereby a total adjustment path $x_{St}$ is reached.

From a signal input 17 an adjustment distance to be set is communicated to the main control unit 3. This desired distance to be set is thereupon, during normal operation, divided by the main control unit 3 into two equal parts and transmitted, via data lines, to the ACUs (Actuator Control Units) 18A and 18B of the control branches 4A and 4B. Within each ACU 18A and 18B this signal is fed into a regulator 19A and 19B and processed together with an actual position of the respective spindle rods 11A or 11B. For this, the actual position is sent to the regulators 19A and 19B via a respective evaluation unit 20A and 20B, which evaluates the respective signals from the linear sensors 15A and 15B. On the basis of these available data the regulators 19A and 19B each calculate an adjustment speed of the associated electric motors 7A and 7B, and transmit these to PCUs (Power Control Units) 21A and 21B of the respective control branches 4A and 4B. The PCUs 21A and 21B are connected by current leads to the respectively associated electric motors 7A or 7B and the associated brakes 13A and 13B, and regulate their current supply. On the basis of the desired speed communicated by the respective regulator 19A or 19B, the PCUs 21A and 21B regulate the current supply to the electric motors 7A and 7B in such manner that the motors reach the required speed. To be able to set the correct speed, the current angular positions of the respective electric motor 7A and 7B to be actuated are communicated to the PCUs 21A and 21B by evaluation units 22A and 22B which evaluate the data from the rotation sensors 14A and 14B. In contrast, the brakes 13A and 13B are supplied with a constant current in order to keep them in the open position. From defined positions of the associated spindle rods 10A and 10B the nominal speeds are reduced by the regulators 19A and 19B until finally, when the desired total adjustment path $x_{St}$ has been reached by the control rod 12, the current supply to the electric motors 7A and 7B is cut off by the PCUs 21A and 21B and the brakes 13A and 13B are closed, again by cutting off their current supply.

Throughout the adjustment movement the linear positions of the spindle rods 10A and 10B detected by the evaluation units 20A and 20B are compared with the angular positions of the electric motors 7A and 7B detected by the evaluation units 22A and 22B. This is done in monitoring units 23A and 23B which are provided in the respective ACUs 18A and 18B and which, on the basis of the data obtained from one of the sensors 14A and 14B or 15A and 15B, determine theoretical values for the respective other sensor 14A and 14B or 15A and 15B and compare them with the values actually detected. For this, physical effects such as resiliencies and hysteresis present in the mechanisms are stored in an associated model in the respective monitoring unit 23A and 23B. If a monitoring unit 23A or 23B detects a substantial deviation between the theoretically determined value and the value actually measured, then the respective associated PCU 21A or 21B is instructed to interrupt the current supply to the brake 13A or 13B concerned and to the respective electric motor 7A or 7B, so causing the brake 13A or 13B to close.

Furthermore, the current operating status is communicated by the PCUs 21A and 21B to the monitoring units 23A and 23B of the respectively associated ACUs 18A or 18B. If in a PCU 21A or 21B the nominal values of the required current regulation are not reached, for example due to the failure of a power-switching component or a short-circuit in one of the electric motors 7A or 7B, then an error signal is sent to the respective monitoring unit 23A or 23B of the associated ACU 18A or 18B. At that moment, the monitoring unit 23A or 23B concerned compels the current interruption, within the respective PCU 21A or 21B, to the associated brake 13A or 13B and to the electric motor 7A or 7B. This again results in closing of the brake 13A or 13B concerned.

If activation of one of the brakes 13A or 13B has taken place, then this is communicated by the respective ACU 18A or 18B of the power branch 4A or 4B to the main control unit 3. Thereupon, the latter varies the nominal adjustment path for the still functional power branch 4A or 4B so that by virtue of the electric drive 6A or 6B concerned the required total adjustment path $x_{St}$ can still be reached. During this, however, due to the lower power an adjustment is carried out less dynamically, but although high-frequency inputs, via the data input 17, cannot then be processed, continuation of the flight and subsequent safe landing are ensured.

By virtue of the electro-mechanical linear actuator unit according to the invention, it is therefore possible in the event that one of the control branches 4A or 4B fails, still to set and reach the required total adjustment path $x_{St}$ without the occurrence of undesired adjustment movements caused by a defective spindle drive 10A or 10B.

INDEXES

1 Actuator portion
2 Control device
3 Main control unit
4A, 4B Control branches
5 Actuator housing
6A, 6B Electric drives
7A, 7B Electric motors
8A, 8B Driveshafts
9A, 9B Spindle nuts
10A, 10B Spindle drives
11A, 11B Spindle rods
12 Control rod
13A, 13B Brakes
14A, 14B Rotation sensors
15A, 15B Linear sensors
16 Housing
17 Data input
18A, 18B ACUs
19A, 19B Regulator
20A, 20B Linear position evaluator units
21A, 21B PCUs
22A, 22B Angular position evaluator units
23A, 23B Monitoring units
$x_G$ Displacement path of actuator housing
$x_{St}$ Total displacement path

The invention claimed is:

1. An electro-mechanical linear actuator unit comprising:
an actuator housing (5) accommodating at least two electric drives (6A, 6B), each of which, when actuated by a control device (2) independently of one another sets an associated drive means of a respective spindle drive (10A, 10B) into rotation so as to bring about a linear adjustment movement of the respective spindle drive (10A, 10B) and produce relative linear adjustment of a control rod (12),
the at least two electric drives (6A, 6B) being located in the actuator housing (5) such that the relative adjustment being produced either by:
simultaneous actuation of the at least two electric drives (6A, 6B), as a sum of the linear adjustment movements of the respective spindle drives (10A, 10B), or
by actuating a single one of the at least two electric drives (6A, 6B), as the linear adjustment movement of the respective spindle drive (10A, 10B),
in an area of each of the at least two electric drives (6A, 6B) a respective brake (13A, 13B) is provided, the brakes being selectively actuated by the control device (2) to prevent the linear adjustment movement of the respective spindle drive (10A, 10B),
the at least two electric drives (6A, 6B) each comprising an electric motor (7A, 7B), having a driveshaft (8A, 8B), the electric motors are independently actuatable by the control device (2) to rotationally drive an associated spindle nut (9A, 9B) of the respective spindle drive (10A, 10B), and
the respective brakes (13A, 13B), are actuatable independently of each other to selectively engage and arrest rotation of the respective driveshafts (8A, 8B).

2. The electro-mechanical linear actuator unit according to claim 1, wherein the at least two electric drives (6A, 6B) are individually actuatable, each by an associated control branch (4A, 4B) of the control device (2), which individually comprises sensor means and is connected to a main control unit (3).

3. The electro-mechanical linear actuator unit according to claim 2, wherein the sensor means comprise a linear sensor (15A, 15B) for detecting a linear position of a spindle rod (11A, 11B) of the associated respective spindle drive (10A, 10B), and a rotation sensor (14A, 14B) for detecting an angular position of the respectively associated electric drive (6A, 6B).

4. The electro-mechanical linear actuator unit according to claim 2, wherein each of the control branches (4A, 4B) is formed by an ACU (18A, 18B) and a PCU (21A, 21B), the respective ACU (18A, 18B) monitors the associated electric drive (6A, 6B) and the respective spindle drive (10A, 10B) via the sensor means, while the respective PCU (21A, 21B) controls the associated electric drive (6A, 6B) and the respective brake (13A, 13B) in accordance with specifications from the associated ACU (18A, 18B).

5. The electro-mechanical linear actuator unit according to claim 1, wherein the associated respective brake (13A, 13B) prevents, when the brake is unenergized, the adjustment movement of the respective spindle drive (10A, 10B), the brakes are axially arranged between the respective electric motor and the spindle nut, the brakes engaging the respective drive shafts so as to stop rotation of the respective spindle nut.

6. A method for operating an electro-mechanical linear actuator unit comprising an actuator housing (5) that accommodates at least two electric drives (6A, 6B), each of which, when actuated by a control device (2) independently of one another sets an associated drive means of a respective spindle drive (10A, 10B) into rotation so as to bring about a linear adjustment movement of the respective spindle drive (10A, 10B) and produce relative linear adjustment of a control rod (12), the at least two electric drives (6A, 6B) are located in the actuator housing (5) such that the relative adjustment is produced either by simultaneous actuation of the at least two electric drives (6A, 6B), as a sum of the linear adjustment movements of the respective spindle drives (10A, 10B), or by actuating a single one of the at least two electric drives (6A, 6B), as the linear adjustment movement of the respective spindle drive (10A, 10B), and a respective brake (13A, 13B), which is actuated selectively by the control device (2) and which then prevents the linear adjustment movement of the respective spindle drive (10A, 10B), is provided in an area of each of the at least two electric drives (6A, 6B), the at least two electric drives (6A, 6B) each comprise an electric motor (7A, 7B), each of which, via an associated driveshaft (8A, 8B), when actuated by the control device (2), sets into rotation an associated spindle nut (9A, 9B) of the respective spindle drive (10A, 10B), and the respective brakes (13A, 13B), when actuated, arrests are actuatable independently of each other to selectively engage and arrest rotation of the associated respective driveshaft (8A, 8B), the method comprising the steps of:

comparing measurement data from respectively associated sensor means within control branches (4A, 4B) and monitoring power-conducting components, and actuating, if a fault is detected, the respectively associated brake (13A, 13B).

7. The method according to claim 6, further comprising the step of, if a fault is detected, communicating modified control specifications from the main control unit (3) to the control branch (4A, 4B) that is still working correctly such that, despite the fault, a required relative adjustment of the control rod (12) is carried out.

8. A computer program product stored on a non-transitory computer-readable storage medium that implements control commands for operating an electro-mechanical linear actuator unit, comprising an actuator housing (5) that accommodates at least two electric drives (6A, 6B), each of which, when actuated by a control device (2) independently of one another sets into rotation an associated drive means of a respective spindle drive (10A, 10B) and so brings about a linear adjustment movement of the respective spindle drive (10A, 10B) to produce relative linear adjustment of a control rod (12), such that the at least two electric drives (6A, 6B) are located in the actuator housing (5) such that the relative adjustment is produced either by simultaneous actuation of the at least two electric drives (6A, 6B), as a sum of the linear adjustment movements of the respective spindle drives (10A, 10B), or by actuating a single one of the at least two electric drives (6A, 6B), as the linear adjustment movement of the respective spindle drive (10A, 10B), and in an area of each of the at least two electric drives (6A, 6B) a respective brake (13A, 13B) is provided, which is actuated selectively by the control device (2) and which then prevents the linear adjustment movement of the respective spindle drive (10A, 10B), the at least two electric drives (6A, 6B) each comprise an electric motor (7A, 7B), each of which, via an associated driveshaft (8A, 8B), when actuated by the control device (2), sets into rotation an associated spindle nut (9A, 9B) of the respective spindle drive (10A, 10B), and the respective brakes (13A, 13B), are actuatable independently of each other to selectively engage and arrest rotation of the associated respective driveshaft (8A, 8B), the electro-mechanical linear actuator unit is operated by a method of comparing measurement data from respectively associated sensor means within control branches (4A, 4B) and monitoring power-conducting components, and actuating the respectively associated brake (13A, 13B) if a fault is detected, such that routines for comparing the measurement data from the sensor means and for monitoring power-conducting components, and also for actuating the brake (13A, 13B) concerned if a fault is detected, are implemented by the control commands.

9. The computer program product for operating the electro-mechanical linear actuator unit according to claim 8, wherein the computer-readable storage medium is incorporated into a data carrier.

* * * * *